United States Patent [19]

Matchette

[11] 4,231,274
[45] Nov. 4, 1980

[54] SAW GUIDE ASSEMBLY

[76] Inventor: Gerald J. Matchette, 3339-236 St., Langley, British Columbia, Canada, V3A 4P6

[21] Appl. No.: 884,609

[22] Filed: Mar. 8, 1978

[51] Int. Cl.³ .................... B23D 55/08; B27B 13/10
[52] U.S. Cl. ............................ 83/820; 279/34; 279/41 R; 83/821; 83/829
[58] Field of Search .................. 83/820, 821, 829; 279/34, 41; 308/3 A

[56] References Cited

U.S. PATENT DOCUMENTS

| 85,329 | 12/1868 | Reid | 279/41 X |
|---|---|---|---|
| 607,931 | 7/1898 | Hoyt | 83/820 |
| 3,363,083 | 1/1968 | O'Conner | 279/34 X |
| 4,085,636 | 4/1978 | Eklund | 83/820 |

Primary Examiner—Donald R. Schran
Attorney, Agent, or Firm—Carver and Company

[57] ABSTRACT

A clamping assembly for clamping a block of wearable material for guiding a band saw blade to maintain the blade in alignment at a working station. The block of wearable material is formed with a dovetail adjacent a rear face remote from the wearing face of the block, and the clamping assembly includes clamping elements having inclined surfaces mating with the inclined surfaces of the dovetail to provide clamping and gripping forces and inwardly directed drawing forces in the block. The clamping elements are separated in the clamping region by a gap permitting them to be drawn towards one another and thereby to exert a clamping force on the dovetail of the block of wearable material. The clamping elements are dimensioned so that one element behaves as a cantilever spaced from the other element, which thereby maintains a fixed relationship with a supporting datum surface. The clamping elements may be integral with one another or provided with contacting surfaces adjacent the rear face thereof.

8 Claims, 6 Drawing Figures

U.S. Patent  Nov. 4, 1980  Sheet 1 of 2  4,231,274
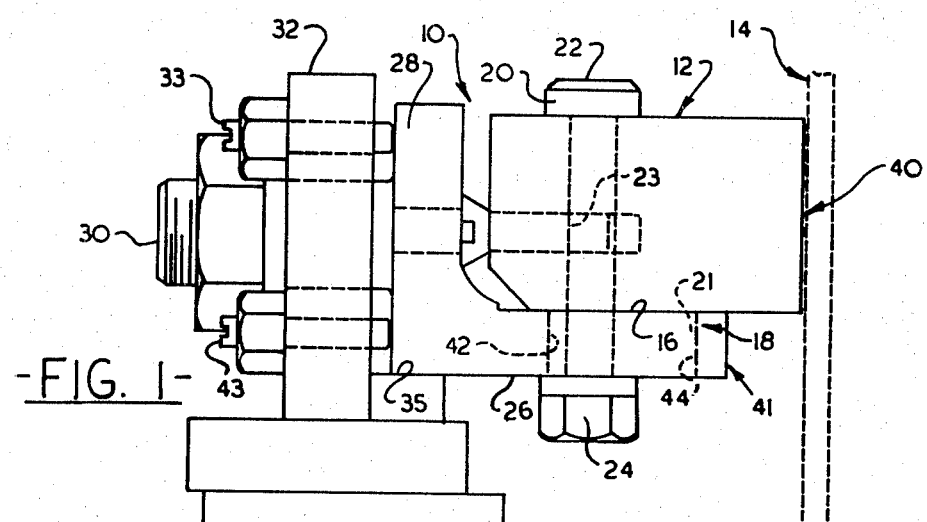
-FIG. 1-  PRIOR ART
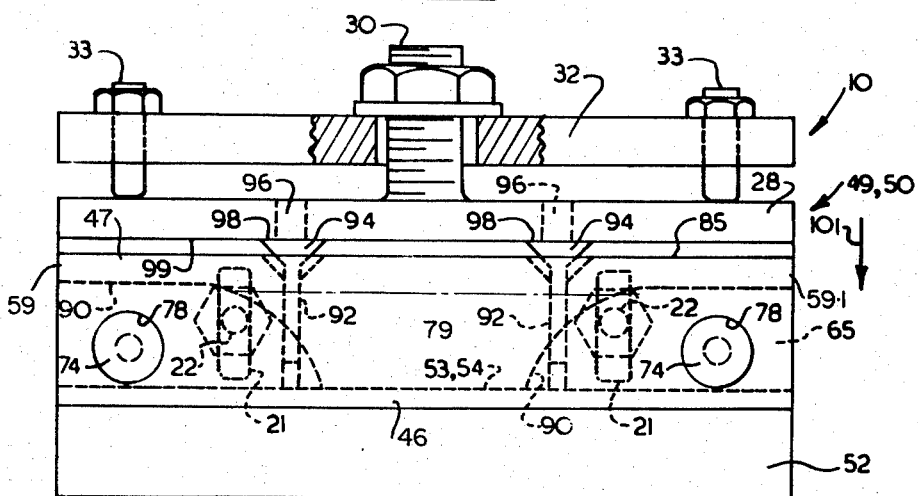
-FIG. 2-
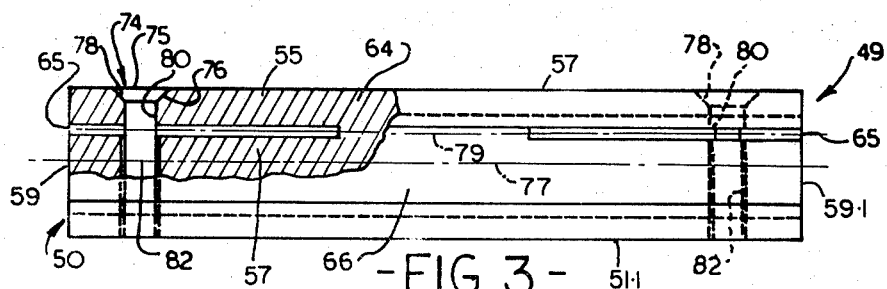
-FIG. 3-

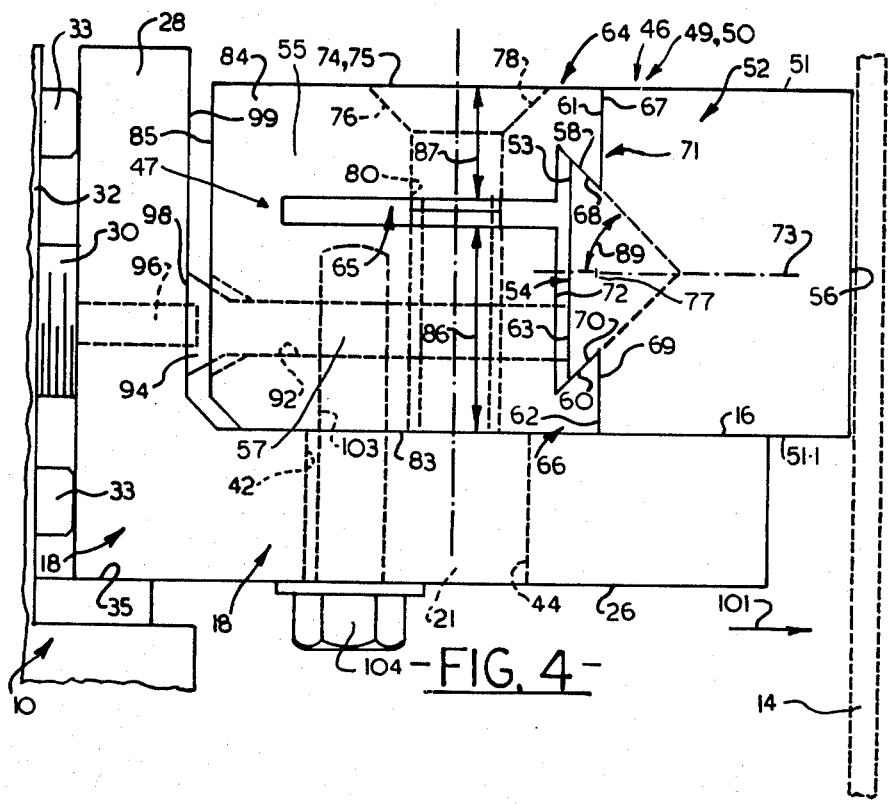
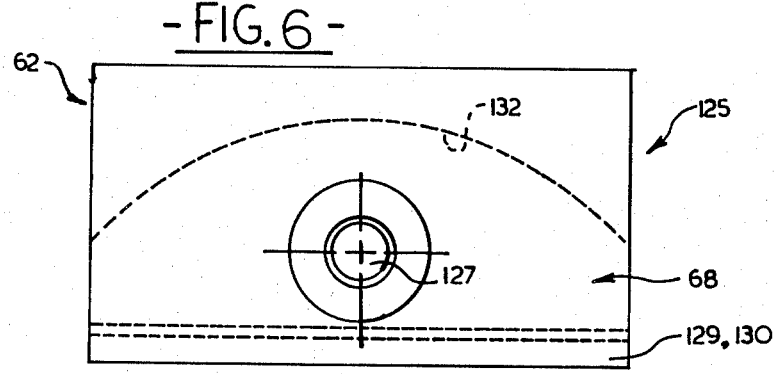
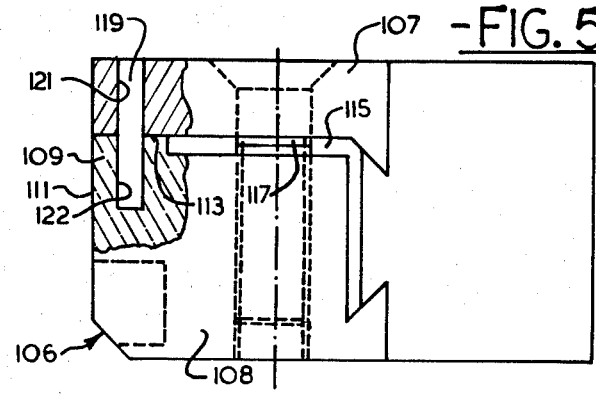

SAW GUIDE ASSEMBLY

BACKGROUND OF THE INVENTION

1. Field of the Invention

This invention relates to a clamping assembly for clamping a block of wearable material.

2. Prior Art

Blocks of wearable but wear-resisting material, for example reinforced phenolic resin, are utilized in sliding engagement with band saw blades or other moving metal parts, the blocks of wearable material acting as guides for maintaining alignment of the moving metal part for accurate cutting or the like. Conventionally, the block of wearable material is maintained in a holding means against a datum surface to maintain proper alignment of the block, and as the block wears adjustment means are provided to accomodate the wear. Some early holding and adjustment means had screws to advance the block towards the saw, after advancement the wear face of the block being "dressed" to provide an accurate wear face. This was time consuming and resulted in excessive saw "down time" as the saw could not operate whilst the blocks were being dressed or adjusted. A "quick change" saw guide assembly was developed which reduced saw down time appreciably by providing a quickly releasable holding structure which can be quickly fitted to the saw with one nut and bolt or other means and yet holds a wear block accurately in a required position with no further adjustment being required until the block was worn beyond predetermined limits. The assembly was then removed and another block and holding structure substituted whilst the worn block was adjusted and re-faced for replacement. One type of quick change saw guide assembly has an upper clamping piece disposed oppositely to the datum surface, both of which overlap a substantial portion of the wearable block. Sometimes more than fifty percent of the volume of the block is necessarily located between opposed holding surfaces of the holding means and thus is unavailable for consumption by wear against the band saw blade or other moving metal element. This means that as the block wears down towards the block portion located between the opposed holding surfaces, eventually a point is reached where perhaps something of the order of fifty percent or more of the block remains intact, at which point no further consumption of the block is possible and it must thereafter be discarded and replaced by a fresh block. This results in considerable waste of the wearable material, which is often fairly costly.

SUMMARY OF THE INVENTION

The invention reduces some of the difficulties and disadvantages of the prior art by providing a clamping assembly for clamping a block of wearable material for retaining the assembly and wear block concurrently in an existing wear block holding means. The clamping assembly serves as a substitute for that portion of the prior art wear block that remains after normal consumption of the block, and clamps on only a relatively small portion of the wearable material so that the block and assembly is securely retained in a common holding means, yet most of the volume of the block may be consumed while remaining thus clamped.

A clamping assembly according to the invention is adapted for clamping a saw guide block of wearable material therein, the block having first and second engaging surfaces adjacent an inner face thereof. The block has an outer face remote from the inner face to serve as a wearing surface to bear against a saw blade of a sawing apparatus, such as a band saw. The clamping assembly and block are received in a holding means of the apparatus for location adjacent a datum surface of the apparatus and can be directly substituted for a prior art guide block. The clamping assembly is characterized by an assembly body having front and rear portions. The front portion has spaced apart first and second clamping elements with oppositely disposed first and second gripping and bearing surfaces respectively spaced on opposite sides of, and disposed parallel to, a clamp axis, the first and second gripping and bearing surfaces being adapted to engage the first and second engaging surfaces respectively of the block. The clamping elements have respective root portions disposed remotely from the gripping and bearing surfaces and extending from the rear portion. The clamping elements are spaced apart by a gap extending forwardly from the rear portion. The rear portion extends essentially continuously between root portions of the body to maintain first and second clamping elements in alignment with one another. The clamping elements are adapted for movement towards each other about a bend axis disposed generally adjacent the root portions and generally parallel to the clamp axis. The clamping assembly also includes clamping means disposed between the root portions and the gripping and bearing surfaces of the clamping elements for applying a clamping force to the clamping elements and thence to the block so that the force deflects the first clamping element about the bend axis toward the second clamping element to narrow the gap therebetween.

The clamping elements can be integral with one another or dowelled together and the gap separing the two clampling elements is sufficiently large so that one of the clampling elements deflects slightly under the clampling force to provide a clamping pressure against the dovetail of the block.

Since it is desired not only to clamp the block but also to maintain an inwardly directed (ie. directed away from the wearing face) force on the block, which tends to stabilize the position of the block, it is desirable to have engaging surfaces of the block and the bearing and gripping surfaces of the clamping elements inclined so that the clamping force applied to the clamping elements is transformed into force components applying both the clamping force and an inwardly directed drawing force on the block relative to the clamping elements. Conveniently this can be accomplished by forming the inner face of the block remote from the wearing face as a dovetail section engaged by mating inclined opposed surfaces of the upper and lower clamping elements.

The guide block according to the invention for use as a saw guide has an outer face to serve as a wearing surface to bear against the saw blade and an inner face remote from the outer face. The block has engaging surfaces adjacent the inner face for gripping by the clamping assembly, two of the engaging surfaces being inclined to each other to form a dovetail section when viewed within a plane perpendicular to the wearing face of the block.

In the detailed description and in the accompanying claims, a particular orientation of the block whereby the datum surface is a generally horizontal lower surface will be assumed. However, the terms "vertical", "horizontal", "upper", "lower", "inward", "outward" and the like should be construed in a relative rather than an absolute sense, since it will be apparent that the orientation of the block and of the clamping elements may be varied to suit particular applications.

A detailed disclosure following, related to drawings, describes a preferred embodiment of the invention which is capable of expression in structure other than that particularly described and illustrated.

DESCRIPTION OF THE DRAWINGS

FIG. 1 is a side elevation of a typical prior art quick change wear block holding means for holding a block of wearable material, FIG. 2 is a simplified fragmented top plan of a clamping assembly according to the invention shown fitted to an existing holding means and shown holding a block according to the invention, FIG. 3 is a fragmented front elevation of a clamping means, the wear block being removed, FIG. 4 is a simplified fragmented side elevation of a clamping assembly according to the invention shown fitted to the existing holding means and holding the block according to the invention, FIG. 5 is a simplified fragmented side elevation of an alternative clamping assembly, FIG. 6 is a simplified top plan of a second alternative clamping assembly.

DETAILED DISCLOSURE

FIG. 1 (Prior Art)

A conventional quick change guide block holding means 10 clamps a wear-resistant wearable guide block 12 for guiding and maintaining in alignment a band saw blade 14 or similar moving metal element, shown at a datum position. The block 12 may be made of any suitable known saw guide material such as a phenolic resin or lignum vitae. The block 12 is a generally rectangular block and is clamped between a datum surface 16 of an L-sectioned clamp support element 18 and upper clamping elements 20. Two laterally spaced clamping screws 22, one only being shown, pass through clearance passages 23 in the block and elongated slots 21 in an offset portion of the support element 18. Each screw 22 has a head 24 bearing against a lower surface 26 of the support element 18 with an upper end threaded in the respective element 20. The support element 18 is provided with a vertical flanged portion 28 from which a main retaining screw 30 extends and passes through a clearance opening in a main post 32 to permit quick connection of the support element 18 to the post. Four adjustable set screws 33, two only being shown in FIG. 1, threadedly engage the main post 32 which is securely fixed to a mounting support 38 fixed to the band saw frame, not shown. The screws 33 are spaced at corners of the portion 28 and can be individually adjusted and then locked so that ends thereof locate the portion 28 at the required inclination. The screws 33 provide fine adjustment of the position and location of support element 18 so that the saw blade can be accurately aligned to the saw line datum as will be described. It is seen that the screw 30 draws the support 18 against ends of the set screws 33 and the lower surface 26 of the element 18 rests on a complementary lower datum face 35.

The block 12 has an outer wearing face 40 which bears against the saw blade 14, and after a time this face wears and is consumed, thus necessitating advancing the block so that the wear face is repositioned in the saw datum. In the early days of this trade, ie. before quick change wear blocks were introduced, the saw would be stopped and the block would be unclamped and the wear face of the block filed to re-establish an accurate wearing face. Usually a replacement block with a re-filed face would then be replaced in a new position, and, after fine adjustment the re-filed face would be accurately positioned in the saw datum for further use. This method was time consuming and resulted in excessive down time of the saw and the "quick change" saw guide concept was introduced which forms no part of this invention. The invention can be used with the older prior art holding means, or with most of the newer quick change types, one of which is illustrated in FIG. 1. With the quick change concept, as wear occurs the block and support element are removed as a unit form the machine and replaced with a remachined block and a replacement element 18. Remote from the saw, the worn wear block is then incrementally advanced relative to the support element 18 for remachining in accurate jigs, not shown. When the block has been remachined it can be refitted in the saw, the support element 18 being again accurately held against the four set screws 33 and quickly re-clamped to the post 32 by the main screw 30. The lower datum face 35 engages the lower surface 26 to establish a horizontal datum which resists downward forces on the element 18 arising from the saw bearing against the block. Thus the element 18 is initially accurately set up using the set screws 33 and once this is established for a particular jig, after remachining of the block, good repeatability of position is attained and further adjustment of the set screws is unnecessary.

As the outer wearing face 40 of the block 12 is worn down and consumed, to accomodate the incremental advance of the block 12 outwardly toward the saw blade 14, ie. away from the portion 28, the clamping screws 22 are received in the respective elongated slots 21 in the support 18, each slot having an inner limit 42 and an outer limit 44. The slots permit the screws 22 to move inwardly and outwardly relative to the flanged portion 28 within the limits 42 and 44 whilst restricting lateral movement of the screw 22.

As the block 12 is advanced, the outer limit 44 is finally reached beyond which there is insufficient guide block material remaining to permit clamping. When the screws 22 bear against the outer limit 44 of the slots, in effect the useful life of the block has ended because it is necessary that the element 18, or clamping element 20, whichever is the closest to the saw blade 14, should not make contact with the saw blade. Thus there is considerable waste in utilizing the conventional clamping assembly of FIG. 1 since about half the volume of the block 12 as originally made is not consumable for purpose intended.

FIGS. 2 through 4

A novel guide block assembly 49 has a clamping assembly 50 according to the present invention, and is used with a relatively simple and ingenious modification of the prior art wear block that reduces considerably the above waste of guide block material. In fact, by selection of certain dimensions the assembly 50 can use remachined rejected guide blocks from prior art holding means, thus reducing waste by recycling previously unusable wear block material. The assembly 50 has an assembly body having front and rear portions 46 and 47 and can grip a guide block 52 of wearable material which is provided with a dovetail 54 adjacent an inner face 53 thereof remote from an outer wearing face 56 of the block 52. The dovetail 54 includes vertically oppositely disposed obliquely inclined engaging surfaces 58 and 60, coplanar outer surfaces 61 and 62 and an inner surface 63, the surfaces 61 through 63 being generally parallel to the wearing face 56, the outer surfaces being disposed on opposide sides of the inner surface. The engaging surfaces are spaced apart and inclined to each other so as to form the dovetail section when viewed endwise of the block and within a plane perpendicular to the wearing face of the block.

The front portion 46 of the clamping assembly 50 includes a first clamping element 64 and a second clamping element 66, opposed faces of the elements being spaced apart by two similar gaps 65, one gap being at each outer end of the elements. The first and second clamping elements 64 and 66 have at respective outer free edges thereof inclined first and second gripping and bearing surfaces 68 and 70 which engage, clamp and grip the corresponding first and second inclined engaging surfaces 58 and 60 respectively of the dovetail 54 of the block 52. The surfaces 68 and 70 are spaced on opposite sides of, and disposed parallel to, a clamp axis 77. The clamping elements have respective root portions 55 and 57 disposed remotely from the gripping and bearing surfaces 68 and 70, and extending from the rear portion 47. The rear portion 47 extends essentially continuously between the root portions 55 and 57 of the elements 64 and 66 respectively and also between opposite end portions 59 and 59.1 of the assembly body.

The assembly 50 has coplanar outer datum faces 67 and 69 which intersect the surfaces 68 and 70 respectively to form inwardly facing "vee" shaped teeth which form a dovetail clamp 71 complementary to the dovetail 54 of the block. The clamp 71 has a dovetail central axis 73 which intersects the clamp axis 77 and is disposed normally to the wearing face 56 of the block, the clamp having an inner face 72 extending between the teeth and spaced from the inner surface 63 of the block to prevent interference therewith. The dovetail section of the block has a main axial plane containing the central and clamp axes 73 and 77 respectively, the main axial plane being disposed normally to the wearing face 56 of the block and normally to friction forces arising from the saw passing over the wearing face block.

The assembly 50 includes a pair of similar laterally spaced pinch screws 74, each screw having a respective head 75 with a conical lower surface 76 engaging a complementary countersunk recess 78 in the first clamping element 64. Each screw passes freely through a respective clearance passage 80 in the clamping element 64 and has an outer threaded portion 82 screwed into the lower clamping element 66, the opening being in portions of the clamping elements adjacent the root portions thereof. It can be seen that tightening the pinch screws 74 narrows the gaps 65 and draws the outer ends of the elements 64 and 66 towards each other, thus clampling the dovetail 54 therebetween. The clamping elements are thus adapted for movement towards each other generally about a bend axis 79 disposed between the root portions and generally parallel to the clamp axis. The pinch screws serve as clamping means disposed between the root portions of the clamping elements and the gripping and bearing surfaces thereof to apply clamping force to the clamping elements and thence to the block and other means can be substituted.

The second clamping element 66 has a lower surface or second outer surface 83 which rests on the horizontal datum surface 16 of the upper surface of the prior art support element 18 and is parallel to a first outer surface 84 of the first element 64. The assembly is preferably formed from a single block of metal of generally square cross section, preferably aluminum, in which the two gaps 65 are conveniently formed simply by slotting or the like, thus producing similar partially curved, interior faces 90 bounding the gaps 65, the curvature being desirable in the interest of strength of the assembly. The clamping elements 64 and 66 are thus integral with themselves and with the rear portion 47 of the assembly 50, and the gaps 65 separating the elements are machined adjacent ends of the block to provide slight flexibility necessary for clamping. As seen in FIGS. 3 and 4, the gaps 65 are positioned assymetrically so that the second element 66 has a thickness 86 greater than thickness 87 of the first element 64.

There are likely to be small variations in the relative dimensions of the dovetail sections of different wear blocks, and, to accomodate these variations and wear, it is preferable that relevant datum surfaces of the clamping assembly are non-moving relative to each other irrespective of the degree of movement, within reasonable limits, of the clamping elements. The thicker lower clamping element 66 serves as an essentially non-changing base for the assembly and the lower surface 83 and a rear face 85 thereof cooperate with portions of the holding means 10 and thus should serve effectively as datum faces and remain in essentially constant angular relationship relative to each other. This is attained in the preferred embodiment as shown by having the second element 66 thicker than the first element 64 so that the first element 64 is considerably more flexible than the second element and is effectively cantilevered relative to the second element. Thus, the second element 66 tends to maintain a fixed relationship with the rear portion 84, ie. the lower surface 83 remains fixed relative to the face 85, whilst permitting the first element 64 to move downwardly toward the second element 66 thus narrowing the gaps 65. The gaps 65 need only be large enough to accomodate enough downward vertical deflection of the clampling element 64 to grip the dovetail 54 of block 52 sufficiently securely to prevent chatter or lateral sliding along the assembly. The surface 83 serves as a primary datum face for locating the assembly relative to the sawing apparatus.

By providing the clearance between the surface 63 and the face 72, a second aspect of the dovetail clamp can be utilized to maintain the block 52 in a stable position drawn against the outer datum faces 67 and 69 of the first and second clamping elements 64 and 66. When the pinch screws 74 are tightened, the surfaces 68 and 70 of teeth of the dovetail grip the block and a normal vertical squeeze force applied by screws 74 to the clamping elements is transformed by the inclined surfaces 58 and 60 of the block and the surfaces 68 and 70 of the clamping elements into an inward component tending to draw the dovetail 54 and thus the block 52 inwardly, ie. away from the saw blade 14 into intimate and stable contact with the outer datum faces 67 and 69 of the clamping elements 64 and 66 respectively, at least one of which serves as a secondary datum face to locate the block on the clamping assembly. If the teeth of the clamp formed at the intersection of the faces 67 and 69 with the surfaces 68 and 70 are "blunt" to provide clearance so as not be cut into the block, accurate and rigid location of the block on the datum faces 67 and 69 is attained.

The bearing surfaces 68 and 70 of the dovetail clamp 71 are inclined at angles of inclination 89 of about 45 degrees to the axis 73. The angles could be dissimilar or varied from the illustrated angles, but the angles however should be selected so that the block 52 is readily insertable between the clamping elements. Also the surfaces of the clamping elements should be generally complementary to and mate with the inclined surfaces of the dovetail of the block so that the application of clamping force to the clamping elements by tightening the screws 74 clamps and draws the block without undue risk of shearing the dovetail away from the main body of the block. Angles of inclination of the dovetail surfaces of between about 5 and 60 degrees to the axis 73 are acceptable.

The guide block assembly 49 thus provides a structure that can be directly substituted for the existing prior art guide block 12 of FIG. 1 in an existing holding means. The guide block 12 is secured to the clamp support element 18 by the clamping screws 22, and advancing means, which are not annotated in FIG. 1, are provided to facilitate advancing of the guide block, when worn, relative to the flanged portion 28, prior to remachining. As the present guide block assembly 49 can be directly substituted for the prior art guide block 12, the clamping assembly 50 also has similar means for advancing the guide block assembly towards the saw. For completeness of disclosure this advancing means will now be described briefly by referring to FIGS. 2 and 4.

The rear face 85 of the clamping assembly 50 has a pair of spaced threaded parallel passages 92 to receive respective advancing screws 94 therein. The flange portion 28 has spaced passages 96 aligned with the passages 92, the passages 96 being sufficiently large to accept means to turn the screws 94, such as an Allen key. It can be seen that outer faces 98 of the heads of the advancing screws 94 are sufficiently larger than the passages 96 to bear against an inner face 99 of the flange portion such that, when the element 18 is removed from the machine, rotation of the screws 94 forces the block in direction of an arrow 101, ie. effectively towards the saw. The second clamping element 66 has a pair of threaded passages 103 to accept respective clamping bolts 104 therein, the passages and screws being equivalent to the passages 23 and screws 22 of FIG. 1. The slots 21 in the element 18 similarly permit advancing of the guide block assembly 49 towards the saw as the block 52 is consumed. Thus the guide block assembly 49 is now clamped onto the surface 26 of the clamp support element 18 by the bolts 104. Because a lower surface of the guide block 52 and the lower surface 83 are essentially coplanar, when the buide block 52 is new, it is likely that the block 52 would also be concurrently supported on the surface 16, such support diminishing as the block 52 is advanced.

Alternative holding and/or adjustment means for advancing, supporting or aligning of the block may be added or substituted as required. The present invention is not concerned with the details of holding or adjusting the clamping assembly and block, but only with the relative structures of the clamping elements 64 and 66 and their particular engagement with the block 52.

OPERATION

To fit the block 52 to the clamping assembly 50 initially, the screws 74 are loosened and the block 52 inserted laterally with the dovetail 54 passing between the opposed surfaces 68 and 70 of upper and lower clamping elements 64 and 66. The dimensions of the dovetail 54 relative to the opposed surfaces 68 and 70 are selected to provide enough clearance to permit the block 52 to be inserted without too loose or too tight a fit. The screws 74 are then tightened, drawing the elements together to grip the block to form the guide block assembly 49. When the wear block 52 is fitted in the clamping assembly 50, the guide block assembly 49 is then treated as a one-piece item as regards the holding means 10. The assembly 49 is fitted to the support element 18 using the clamping bolts 104 similar to the prior art guide block, and there is little change in its use apart from considerable reduction in wasted material. The assembly 49 is moved incrementally toward the saw after each remachining of the wearing face 56. The block 52 is consumed almost to the outer datum faces 67 and 69 which, as can be seen in FIG. 4, leaves very little wear block material to throw away. When the block 52 is consumed, a new block can be fitted permitting indefinite use of the clamping assembly 50.

ALTERNATIVES AND EQUIVALENTS

The dovetails illustrated are substitutable by other configurations which accomodate the required clamping and gripping adjacent the inner face 53 of the block. An adequate clamping force tending to squeeze the block between the clamping elements is considered more important than the inwardly directed force drawing the block away from the saw because the block is forced outwardly by the saw, that is against the clamping assembly during normal operation of the device.

FIG. 5

A first alternative clamping assembly 106 has a first and second clamping element 107 and 108 formed as separate elements contrasting with the integral elements of FIGS. 2 through 4. The second clamping element 108 is provided with a stepped shoulder 109 adjacent an outer face 111 thereof and a lower surface 113 of the first clamping element 107 is supported on the shoulder, thus forming a gap 115 between the two elements adjacent a pinch screw 117 which functions in the same manner as the screw 74 of FIGS. 2 through 4. To maintain the clamping elements 107 and 108 in alignment, a dowel 119 is received in complementary aligned passages 121 and 122 in the first and second clamping elements 107 and 108 in adjacent complementary face portions remote from the wearing face of the block. Two or more dowels 119 extend in passages within the clamping elements to improve the stability of the alignment of these elements. Note that the gap 115 is formed relative to the dovetail in a slightly different location from that illustrated in FIG. 3; the particular choice of dovetail arrangement and position of the gap relative thereto is not significant; considerable variation in design can be accomodated.

Alternatively, a key and complementary key way structure, not shown, could be substituted for the dowels and passages illustrated in FIG. 5. It is seen that integral clamping elements, as shown in FIGS. 2 through 4, or discrete elements dowelled, as in FIG. 5, or keyed together or other equivalent means serve as means to maintain the clamping elements in alignment with one another and with the block.

FIG. 6

A second alternative clamping assembly 125 is simpler than the preferred embodiment shown, both types being adaptable to respective popular forms of holding means used in the bandmill industry. The second alternative assembly 125 is particularly adapted for use in a pocket-type holding means of a saw guide assembly as shown in U.S. Pat. No. 3,872,762, inventors McKillip and Mason. The holding means of this patent is a rectangular-sectioned recess with adjusting screws therein, and it can be seen that the guide block of this reference has a wearing face inclined to a main axis of the guide means.

The second alternative assembly 125 is considerably shorter than the assembly 50 of FIGS. 2 through 4 and thus a single, centrally located pinch screw 127 only is required. The assembly 125 has similar first and second clamping elements 129 and 130 spaced apart by a single gap, not shown, the gap having a curved rear bounding face 132 shown in broken outline. The clamping assembly 125, when fitted with an appropriate guide block, is similarly directly substitutable for a prior art guide block and the assembly is similarly adaptable to the variations described above. It is noted that the wearing face of the guide block in the above United States patent is obliquely inclined to a main longitudinal axis of the block. This is acceptable to the clamping means of the present invention. In such a structure, and in the other structures described, it is noted that the engaging surfaces of the block are formed into a dovetail section when viewed within a plane perpendicular to the wearing face of the block, ie. as viewed looking "through" the dovetail section of the clamping assembly.

I claim:

1. A clamping assembly for clamping a saw guide block of wearable material therein, the block having first and second engaging surfaces adjacent an inner face thereof, and an outer face remote from the inner face to serve as a wearing face to bear against a saw blade of a sawing apparatus, the clamping assembly and block being received in a holding means of the sawing apparatus for location relative to a datum surface of the sawing apparatus, the clamping assembly being characterized by:
   (a) an assembly body having front and rear portions; the front portion having spaced apart first and second clamping elements with oppositely disposed first and second gripping and bearing surfaces respectively spaced on opposite sides of, and disposed parallel to, a clamp axis; the first and second gripping and bearing surfaces being adapted to engaged the first and second engaging surfaces respectively of the block, the clamping elements having respective root portions disposed remotely from the gripping and bearing surfaces and extending from the rear portion, the clamping elements being spaced apart by a gap extending forwardly from the rear portion, the rear portion extending essentially continuously between root portions of the clamping elements and between opposite end portions of the body to maintain the first and second clamping elements in alignment with one another, the clamping elements being adapted for movement towards each other about a bend axis disposed generally adjacent the root portions and generally parallel to the clamp axis,
   (b) clamping means disposed between the root portions and the gripping and bearing surfaces of the clamping elements for applying a clamping force to the clamping elements and thence to the guide block, so that the clamping force deflects the first clamping element generally about the bend axis towards the second clamping element to narrow the gap therebetween.

2. A clamping assembly as claimed in claim 1 in which the assembly body is further characterized by:
   (a) the second clamping element having a primary datum face for location relative to the datum surface of the sawing apparatus,
   (b) the first element being more flexible than the second element so that the first element is effectively cantilevered relative to the second element,
so that as the clamping elements are drawn together to narrow the gap therebetween, the datum face of the second element is essentially unaffected and thus serves as a non-changing base for the clamping assembly.

3. A clamping assembly as claimed in claim 2 in which the assembly body is further characterized by:
   (a) the gap between the clamping elements being displaced towards the first clamping element so that the second element is thicker than the first element.

4. A clamping assembly as claimed in claim 1 in which the assembly body is further characterized by:
   (a) the first and second clamping elements having, on opposite sides of the assembly body, first and second outer surfaces respectively, the second outer surface serving as a primary datum face for location relative to the datum surface of the sawing apparatus,
   (b) the gap being disposed closer to the first outer surface of the first element so that the second element is thicker than the first element, thus making the first element more flexible than the second element,
so that as the clamping elements are drawn together to narrow the gap therebetween, the datum face of the second element is essentially unaffected and thus serves as a non-changing base for the clamping assembly.

5. A clamping assembly as claimed in claim 1 wherein the clamping means for applying a clamping force is characterized by:
   (a) portions of the clamping elements adjacent the root portions thereof having aligned openings therein,
   (b) a screw passing through the aligned openings and across the gap and threadedly engaging one clamping element, the screw having a head with a bearing surface for applying force to the other clamping element.

6. A clamping assembly as claimed in claim 1 in which the first and second engaging surfaces of the saw guide block are oppositely disposed and obliquely inclined to each other to form a dovetail section when viewed within a plane perpendicular to the wearing face of the block, and the clamping assembly is further characterized by:
   (a) the gripping and bearing surfaces of the clamping elements are inclined and generally complementary to and mate with the inclined engaging surfaces of the saw guide block for applying clamping forces and inward drawing forces on the guide block.

7. A clamping assembly as claimed in claim 6 in which the dovetail section of the guide block has a main axial plane disposed normally to the wearing face of the block and further includes an inner surface and coplanar outer surfaces which are disposed on opposite sides of the inner surface, at least one outer surface serving as the block datum face, the inner surface being spaced from the outer surfaces, the inner and outer surfaces intersecting the first and second engaging surfaces of the block, and the clamping assembly is further characterized by:

(a) the clamping elements having coplanar outer datum faces which intersect the inclined gripping and bearing surfaces of the clamping elements to form inwardly facing vee-shaped teeth to form a dovetail clamp, at least one of the outer datum faces serving as a secondary datum face, the clamping assembly further including an inner face extending between the teeth which, when the clamping assembly engages a block is spaced from the inner surface of the block to prevent interference therewith, the outer datum faces being generally parallel to frictional forces on the wearing face of the block arising from the saw passing over the block, so that the drawing forces draw the outer datum surfaces of the guide block against the outer datum faces of the first and second clamping elements to provide spaced apart bearing faces to essentially prevent rocking between the guide block and the clamping assembly.

8. A clamping assembly as claimed in claim 6 further characterized by:

(a) at least one of the gripping and bearing surfaces of the clamping assembly is inclined to the main plane of the dovetail section at an angle of between 5 and 60 degrees, (b) the first and second clamping elements having, on opposite sides of the assembly body, first and second outer surfaces respectively, the second outer surface serving as a primary datum face for location relative to the datum surface of the sawing apparatus, the outer surfaces of the body being parallel to each other and having a depth of similar order of magnitude as depth of the front and rear portions of the clamping assembly thus defining a clamping assembly of approximately square cross section when viewed endwise of the clamping assembly and within a plane perpendicular to the wearing face of the block.

* * * * *